United States Patent [19]
Hitzelberger

[11] Patent Number: 6,061,368
[45] Date of Patent: May 9, 2000

[54] CUSTOM CIRCUITRY FOR ADAPTIVE HARDWARE ROUTING ENGINE

[75] Inventor: James A. Hitzelberger, Westlake Village, Calif.

[73] Assignee: Xylan Corporation, Calabasas, Calif.

[21] Appl. No.: 08/964,597

[22] Filed: Nov. 5, 1997

[51] Int. Cl.[7] ................................................. H04J 3/02
[52] U.S. Cl. ...................... 370/537; 709/238; 711/108
[58] Field of Search ............................ 370/400, 401, 370/402, 403, 404, 537; 709/240, 249, 238; 711/101, 104, 108

[56] References Cited

U.S. PATENT DOCUMENTS

| | | | |
|---|---|---|---|
| 5,027,350 | 6/1991 | Marshall | 370/401 |
| 5,490,252 | 2/1996 | Macera et al. | 709/249 |
| 5,546,390 | 8/1996 | Stone . | |
| 5,845,091 | 12/1998 | Dunne et al. | 709/240 |
| 5,854,899 | 12/1998 | Callon et al. | 709/238 |
| 5,930,257 | 7/1999 | Smith et al. | 370/401 |
| 5,959,968 | 9/1999 | Chin et al. | 370/216 |

OTHER PUBLICATIONS

Bransky & Passmore, Layer 4 Switching, White Paper published at http://www.decisys.com/Documents/WhitePapers/L4_switching (Sep. 1997).

*Primary Examiner*—Ajit Patel
*Assistant Examiner*—Bob A. Phunkulh
*Attorney, Agent, or Firm*—Christie, Parker & Hale, LLP

[57] ABSTRACT

Custom circuitry for an adaptive, RAM-based, hardware routing engine conforms bit selection dynamically to information made available by a self-optimizing data hashing algorithm. Circuitry includes a staggered multiplexor array for selecting bits from only the most distinctive bit positions of an inbound identifier to effectuate associative comparisons at approximately CAM speeds under perfect or near perfect hash conditions. The custom circuitry includes means for monitoring routing performance and instructing a processing element to correct the hashing algorithm when performance has sufficiently deteriorated. The custom circuitry also has an extended recursive look-up capability.

13 Claims, 7 Drawing Sheets

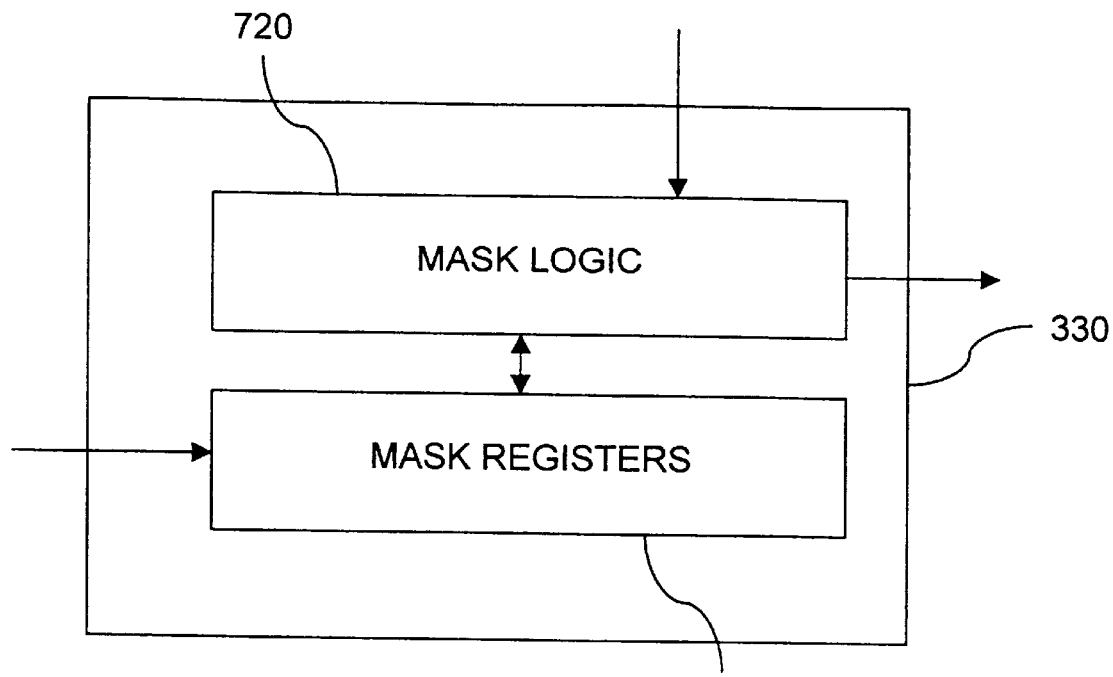
Figure 7
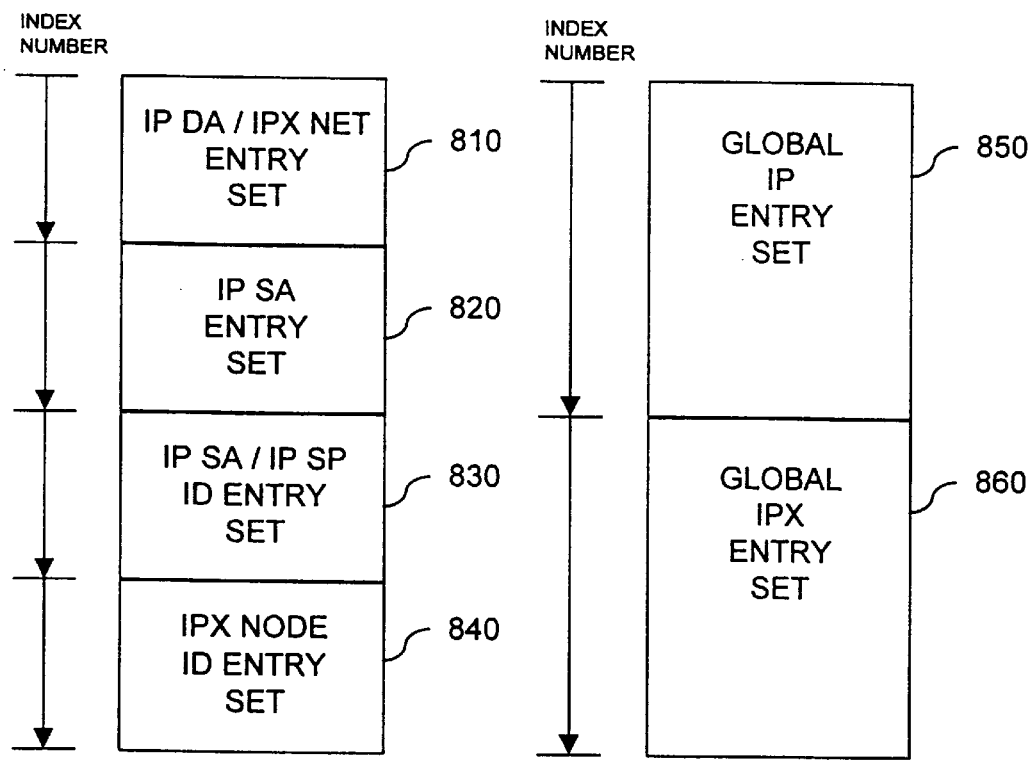
Figure 8a
Figure 8b

CUSTOM CIRCUITRY FOR ADAPTIVE HARDWARE ROUTING ENGINE

FIELD OF THE INVENTION

The present invention relates to routing data between computer networks and, more particularly, to custom circuitry for hardware routing engines of the type which perform associative comparisons in random access memory (RAM).

BACKGROUND OF THE INVENTION

Routing engines are implemented in data communication networks to make routing decisions on packets received from network devices. Routing decisions are generally made by comparing, for a match, identifiers encoded in the inbound packets with identifiers stored in a memory element associated with the routing engine. Conventionally, such associative comparisons were performed in software-only routing engines which employed routing software in a central processing unit (CPU) to compare the inbound identifiers with identifiers stored in a random access memory (RAM). However, dramatic increases in the amount of internet traffic eventually created a need for routing speeds beyond the capability of many software-only routing engines. This need gave rise to hardware routing engines which use custom circuitry to perform associative comparisons. One type of hardware routing engine performs associative comparisons using a content addressable memory (CAM). A different type of hardware routing engine performs associative comparisons using RAM.

CAM-based hardware routing engines have advantages in terms of the speed at which CAM entries can be accessed. CAM allows an inbound identifier to be compared simultaneously with all entries in the CAM, guaranteeing that any matching identifier will be revealed on the first attempt. However, when implementing a hardware routing engine, consideration must be given not only to routing speed, but also to the extent to which shared resources are required to achieve the routing speed, the number of entries required and the cost of implementation. CAM generally has a complex internal architecture which is expensive to implement and provides limited storage capacity. Thus, RAM-based hardware routing engines have been developed in an attempt to achieve routing speeds comparable to CAM-based hardware routing engines while performing associative comparisons in generally less expensive and larger capacity RAM.

A considerable technical challenge facing RAM-based hardware routing engine designers is how to work-around the access limitation of RAM. RAM allows an inbound identifier to be compared against only one RAM entry at a time. Thus, when searching RAM for a match for an inbound identifier, an orderly approach to accessing entries must be taken in order to avoid unacceptably slow routing speeds. One orderly approach involves reducing the inbound identifiers to a bounded set of numerically-related pointers using a hashing algorithm.

As implemented in a hardware routing engine, a hashing algorithm reduces each identifier to a pointer which includes only the bits from bit positions that the algorithm has determined are the most effective at distinguishing identifiers from one another. Each pointer is used to write its associated identifier at a RAM index which matches (or is numerically-related to) the pointer. Assuming that each pointer reduced in this manner has at least one bit which distinguishes it from previously reduced pointers, a condition called a "perfect hash", each inbound identifier on which a routing decision must be made may then be reduced to a pointer using the same hashing algorithm and used to read the identifier at the RAM index which matches (or is numerically-related to) the pointer to reveal any matching identifier on the first attempt. Accordingly, under perfect or near perfect hash conditions, speeds approximating CAM speeds may be realized in a memory substantially larger than a CAM and at a fraction of the cost. Of course, to the extent the hashing algorithm is imperfect, pointers reduced from different identifiers may not retain distinguishing bits and may point to the same RAM index. This undesirable condition is generally addressed by writing the different identifiers having indistinguishable pointers to RAM as entries in the same linked list, or "bucket", which must be read from one-entry-at-a-time until a matching identifier is found.

While RAM-based hardware routing engines as generally described above have been implemented, there remains a need for an efficient RAM-based hardware routing engine that fulfills the basic promise of achieving and sustaining routing speeds that approximate CAM speeds. One reason this need has remained unmet is that RAM-based hardware routing engines have typically employed static hashing algorithms which, regardless of how perfect at the outset, have failed to dynamically adapt to changing patterns of bit position distinctiveness in order to retain their level of quality over time. This inability to dynamically adapt has caused buckets to fill-up with large numbers of entries over a sustained period of operation and, therefore, resulted in increasingly deteriorating routing speeds.

Furthermore, known RAM-based hardware routing engines are not believed to have provided extended recursive look-ups. In large and high-traffic networks, it is often desirable to base routing decisions on more than one matching identifier. Thus, a more complete RAM-based hardware routing solution would include a means, if an associative comparison results in a match and another associative comparison is indicated, for automatically initiating and performing the indicated associative comparison.

Thus, there is a need for a RAM-based hardware routing engine which sustains approximately CAM speeds over time while retaining the cost and size advantages of RAM-based routing engines. There is also a need for a RAM-based hardware routing engine which has an extended recursive look-up capability.

SUMMARY OF THE INVENTION

In accordance with its basic feature, the present invention provides custom circuitry for an adaptive, RAM-based, hardware routing engine.

In one aspect of the invention, the custom circuitry includes a staggered multiplexor array for implementing an adaptive hash mask which governs bit selection. Each one of an array of multiplexors equal in number to the desired bit-length of a pointer is assigned a subset of bit positions within a set of bit positions equal in number to the bit-length of an inbound identifier. The assigned subsets are offset by one-position increments such that the bit position subset assigned to each multiplexor includes all but the initial bit position assigned to any previous multiplexor and all but the terminal bit position assigned to any subsequent multiplexor. Each multiplexor is assigned an equal number of bit positions sufficiently large such that each bit position is assigned to at least one multiplexor. The multiplexor array uses the latest hash mask calculated using the hashing algorithm and stored in a memory element to select, up to the desired pointer length, bits of the inbound identifier. The selected bits are concatenated with an offset to form an initial pointer to a RAM index. Provided the hashing algorithm is sufficiently accurate to define a perfect or near perfect hash upon initialization, the multiplexor array enables near-CAM speed associative comparisons to be sustained in a RAM-based hardware routing engine by simply recalculating the hash mask and updating the contents of the memory element whenever routing performance has sufficiently deteriorated due to changes in bit position distinctiveness occurring after the previous determination was made.

In another aspect of the invention, the custom circuitry includes means for measuring routing performance and for causing the hash mask to be updated when routing performance has sufficiently deteriorated. A performance monitor tracks routing speed and instructs a processing element to recalculate the hash mask and update the memory element whenever routing speed has been sufficiently degraded. Preferably, the processing element recalculates the hash mask and updates the memory element on clock cycles on which the processing element would otherwise be idle. Provided the hashing algorithm is sufficiently accurate to define a perfect or near perfect hash upon initialization, the performance monitor enables the perfect or near perfect hash to be sustained without consuming critical processing clock cycles.

In another aspect of the invention, the custom circuitry includes an extended recursive look-up capability. Whenever an associative comparison on an inbound identifier results in a match, and the matching entry indicates an extended look-up mode, a new associative comparison is automatically initiated and performed in the indicated look-up mode. Routing decisions may thereby be advantageously made based on the results of multiple associative comparisons performed a single packet.

These and other objects of the invention can be understood by reference to the following detailed description, taken in conjunction with the accompanying drawings, which are briefly described below. Of course, the actual scope of the invention is defined by the appended claims.

BRIEF DESCRIPTION OF THE DRAWINGS

FIG. 7 is a block diagram of the mask control of FIG. 3;

FIG. 8a is a partial diagram of the hash RAM of FIG. 1 operative in accordance with preferred embodiment of the invention;

FIG. 8b is a partial diagram of the hash RAM of FIG. 1 operative in accordance with a more preferred embodiment of the invention;

DETAILED DESCRIPTION OF THE PREFERRED EMBODIMENT

Figure 1:
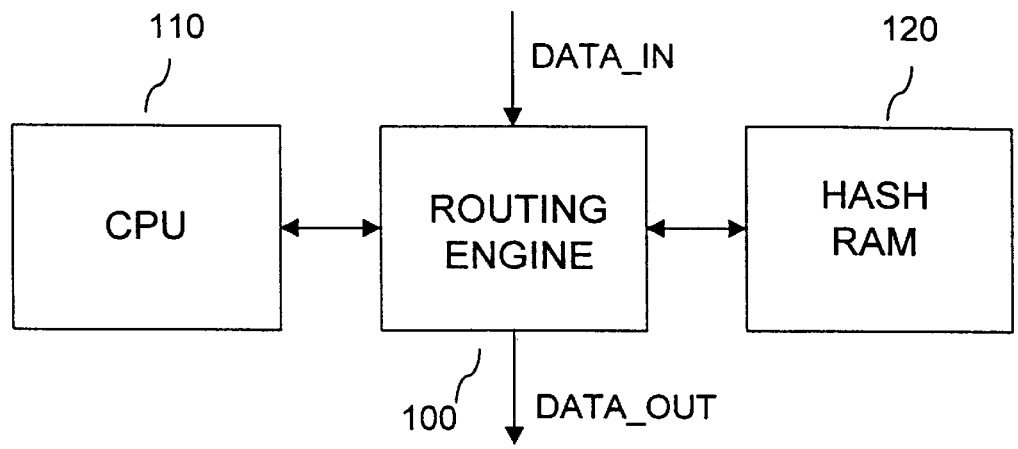
FIG. 1 is a block diagram of a network configuration in which the present invention may be implemented.

Referring to FIG. 1, a network configuration 10 in which the present invention may be implemented is shown. Configuration 10 includes a routing engine 100 having interfaces to a central processing unit (CPU) 110 and a hash RAM 120. Engine 100 receives inbound packets on input pin DATA_IN for routing, makes routing decisions on inbound packets, and transmits outbound packets on output pin DATA_OUT. Engine 100 makes routing decisions by performing associative comparisons on routing identifiers encoded in inbound packets. Routing decisions generally result in inbound packets either being transmitted in unmodified form, transmitted in modified form, or being filtered.

Figure 2:
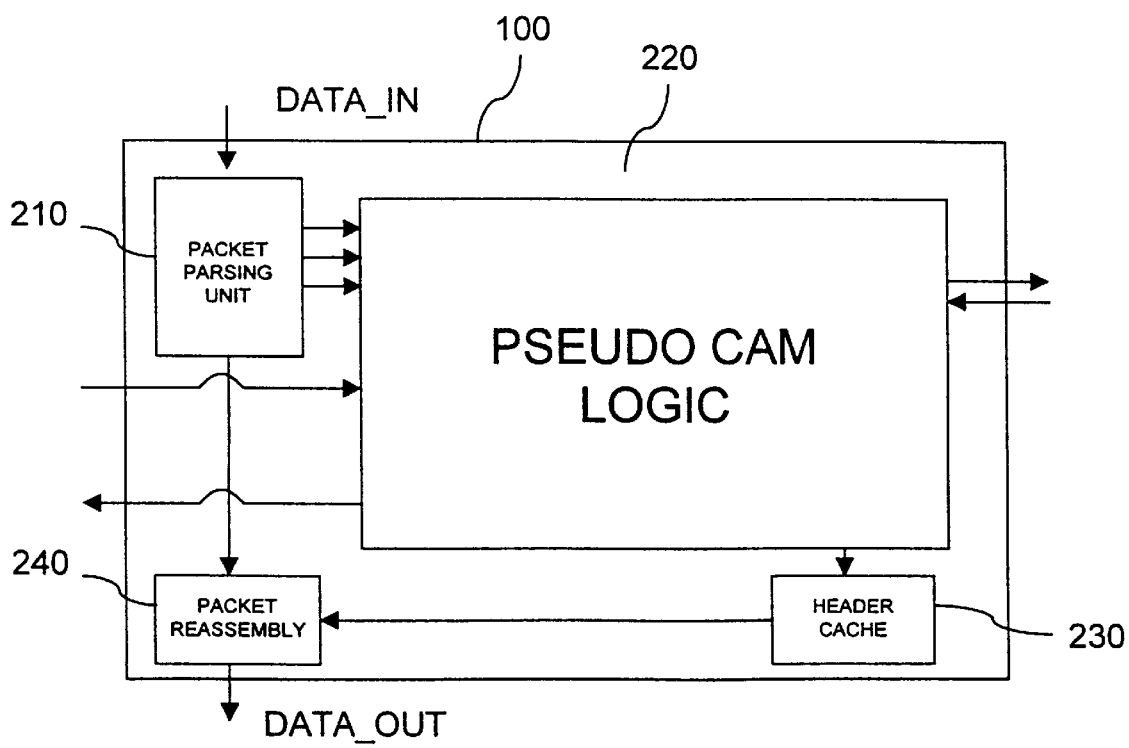
FIG. 2 is a block diagram of the routing engine of FIG. 1.

Referring to FIG. 2, routing engine 100 is shown in greater detail. Engine 100 includes packet parsing unit 210, pseudo CAM logic 220, header cache 230 and packet assembly 240. Packet parsing unit 210 parses inbound packets based on protocol and extracts identifier sets for use in associative comparisons performed within engine 100. In a preferred embodiment, each packet includes Open Systems Interconnection (OSI) Model "Layer 3" (Network) and/or "Layer 4" (Transport) identifiers. By way of example, each packet may be a TCP/IP or IPX packet. For TCP/IP packets, each identifier set preferably includes a 32-bit IP destination address, a 32-bit IP source address, a 16-bit TCP source port identifier, for a total of eighty bits. For IPX packets, each identifier set preferably include a 32-bit IPX destination network identifier and a 48-bit IPX destination node identifier, for a total of eighty bits. Packet parsing unit 210 transmits each extracted identifier set to pseudo CAM logic 220 along with an associated look-up request, and transmits the remaining packet contents to packet reassembly 240. Pseudo CAM logic 220 is operative in one or more look-up modes, in conjunction with hash RAM 120, to perform associative comparisons in hash RAM 120 on components from each identifier set received from packet parsing unit 210 and to issue, for any matching entry, a header index for retrieving routing information from header cache 230. The routing information retrieved from header cache 230 may then be transmitted to packet reassembly 240 for encoding in the header of an outbound packet associated with the inbound packet from which the identifier set was extracted. Packet reassembly 240 reassembles the outbound packet using the routing information and the remaining packet contents received from packet parsing unit 210 and transmits the outbound packet on output pin DATA_OUT. Packet parsing unit 210, header cache 230 and packet assembly 240 may be implemented in custom circuitry using elements and techniques known to the art.

Figure 3:
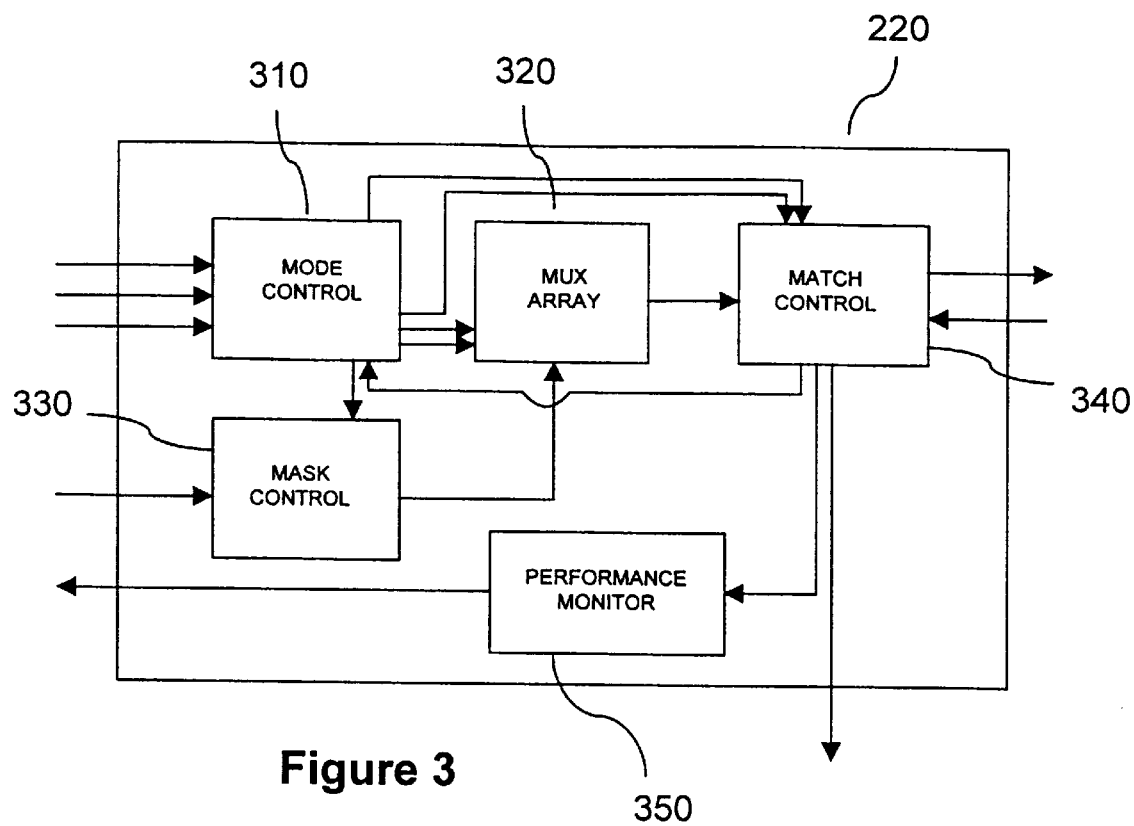
FIG. 3 is a block diagram of the pseudo CAM logic of FIG. 2.

An important object of the present invention is to provide custom circuitry for performing associative comparisons in RAM at approximately CAM speeds over a sustained period of operation. Pseudo CAM logic 220 includes circuitry suited to this objective. Turning to FIG. 3, in a preferred embodiment, psuedo CAM logic 220 includes mode control 310, multiplexor array 320, mask control 330, match control 340 and performance monitor 350.

Figure 4:
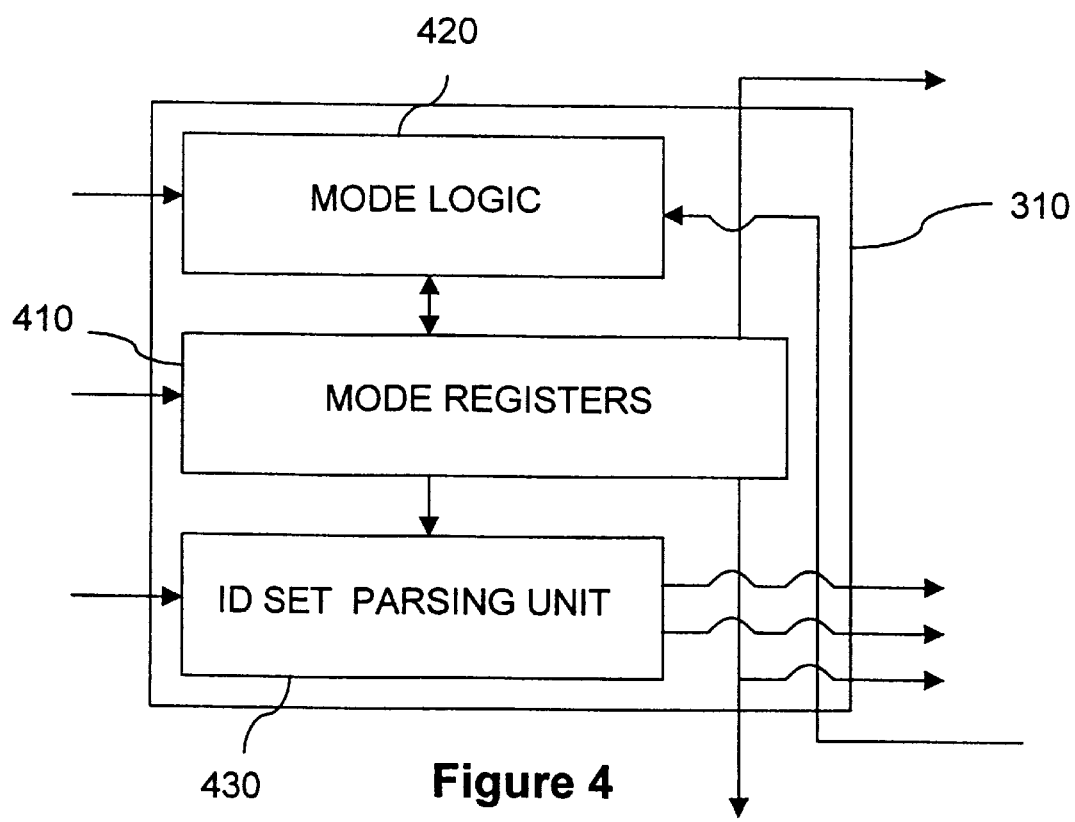
FIG. 4 is a block diagram of the mode control block of FIG. 3.
Figure 5A:
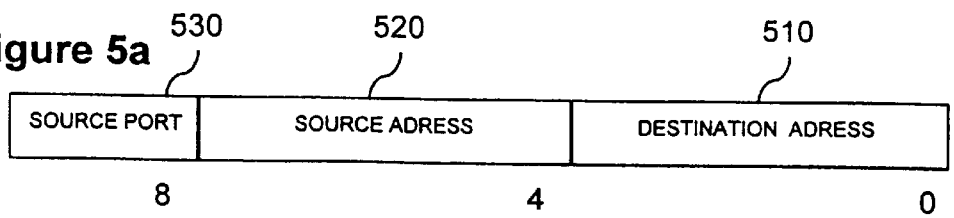
FIG. 5a illustrates the format of an IP identifier set received by the pseudo CAM logic of FIG. 2.
Figure 5B:
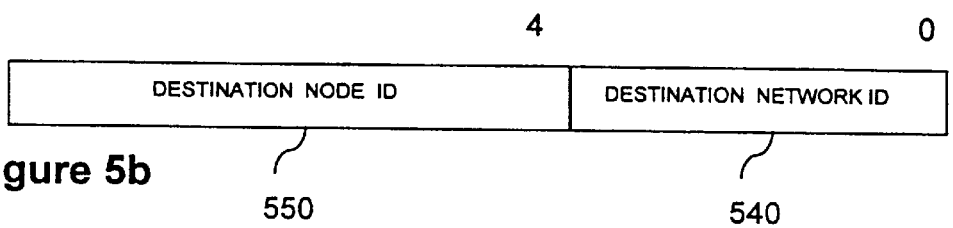
FIG. 5b illustrates the format of an IPX identifier set received by the pseudo CAM logic of FIG. 2.

Mode control 310 initiates an associative comparison in a selected mode for each received look-up request or mode change request. Referring to FIG. 4, mode control 310 includes mode registers 410 associated with mode logic 420 and identifier set parsing unit 430. Mode registers 410 are programmable memory elements containing a command set for each look-up mode configured on engine 100. In a preferred embodiment, look-up modes include an initial mode for conducting an associative comparison on an inbound identifier from each inbound identifier set and one or more extended modes for conducting, where indicated, additional associative comparisons on other identifiers from the same identifier set. For each TCP/IP identifier set, the initial mode preferably provides commands for use in looking-up an IP destination address, whereas the extended modes preferably provide commands for use in looking-up an IP source address, or an IP source address and source port identifier pair. For each IPX identifier set, the initial mode preferably provides commands for use in looking-up an IPX network identifier, whereas an extended mode preferably provides commands for use in looking-up an IPX node identifier. Mode registers 410 may be advantageously configured as an array of registers, each of which holds the command set for a different mode. Each command set preferably includes a pointer command indicating the bytes within the identifier set to be selected for use, as reduced and offset, as an initial pointer to hash RAM 120; a match command indicating the bytes within the identifier set to be selected for use as the comparand with match information retrieved from hash RAM 120; a mask select command indicating the nature and extent of reduction required to convert the inbound identifier into an outbound pointer; and an offset command indicating the offset to be concatenated with the outbound pointer to form the initial pointer to hash RAM 120. Mode logic 420 receives look-up requests from packet parsing unit 210 and mode change requests from match control 340, which are sufficient to identify a look-up mode. Upon receipt of such a request, mode logic 420 causes a command set corresponding with the identified look-up mode to issue from mode registers 410, including a match command, a pointer command, a mask select command and an offset command. Pointer command causes identifier set parsing unit 430 to extract selected bytes from the inbound identifier set and transmit to multiplexor array 320 an inbound identifier including the selected bytes. Match command causes identifier set parsing unit 430 to extract selected bytes from the inbound identifier set and transmit to match set 430 a match identifier including the selected bytes. Referring to FIGS. 5a and 5b, the extracting function of mode control 310 may be illustrated by reference to the format of IP and IPX identifier sets received from packet parsing unit 210. In the IP case (FIG. 5a), the identifier set includes IP destination address 510, IP source address 520 and IP source port identifier 530. Destination address 510 occupies bytes 0 through 3, source address 520 occupies bytes 4 through 7, and source port identifier 530 occupies bytes 8 and 9. Accordingly, in the initial look-up mode, pointer command instructs that bytes 0 through 3 be chosen as the inbound identifier and match command instructs that bytes 0 through 3 be chosen as the match identifier. Similarly, IPX identifier set (FIG. 5b) includes IPX destination network identifier 540 and IPX destination node identifier 550, such that in the initial look-up mode pointer command instructs that bytes 0 through 3 be chosen as the inbound identifier and match command instructs that bytes 0 through 3 be chosen as the match identifier. It should be appreciated, however, that byte numbers for inbound identifiers may not always correspond to byte numbers for match identifiers, as in the case where an IP source address is to be chosen as the inbound identifier and an IP source address and source port identifier pair is to be chosen as the match identifier. Mode control 310 transmits mask select command to mask control 330 and to multiplexor array 320 and transmits offset command to match control 340. Mode registers 410 may be advantageously programmed and updated by CPU 110 to conform the mode capabilities of pseudo CAM logic 220 with the operative network environment.

Figure 6:
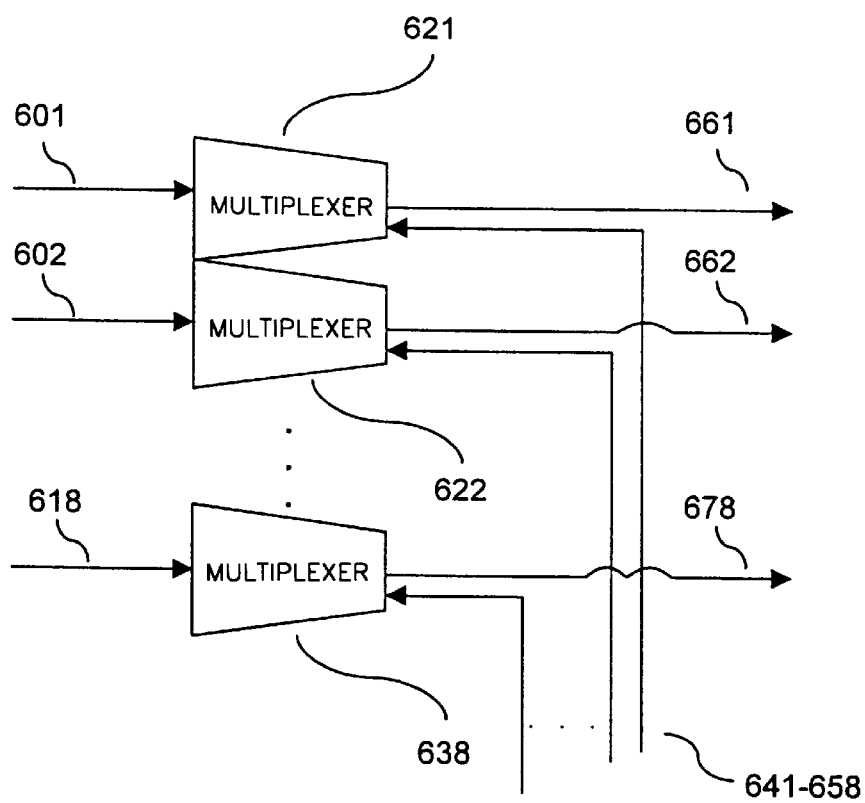
FIG. 6 is a diagram of the multiplexor array of FIG. 3.

Referring now to FIG. 6, multiplexor array 320 is shown in greater detail. Multiplexor array 320 includes an array of staggered multiplexors 621–638 for reducing an inbound identifier received from mode control 310 into an outbound pointer which includes bits of the inbound identifier from bit positions that a hashing algorithm has determined are the most effective at distinguishing inbound identifiers from one another. The inbound identifier is received by multiplexors 621–638 on input lines 601–618 which each transmit a subset of bits of the inbound identifier. Input lines 601–618 are staggered by one-bit increments so that the bits on each line include all but the initial bit included on any previous line and all but the terminal bit included on any subsequent line. Each of input lines 601–618 is assigned an equal number of bit positions large enough such that each bit position is assigned to at least one of lines 601–618. In a preferred embodiment, there are eighteen input lines 601–618 which are each assigned distinct bit positions for both a 32-bit and 48-bit inbound identifier. For the 32-bit identifier, input line 601 is preferably assigned bit positions 0 through 14, input line 602 is assigned bit positions 1 through 15, input line 603 is assigned bit positions 2 through 16, and so on. For a 48-bit identifier, line 601 is preferably assigned bit positions 0 through 30, line 602 is assigned bit positions 1 through 31, line 603 is assigned bit positions 2 through 32, and so on. Each of multiplexors 621–638 interfaces with one of input lines 601–618 and one of single-bit output lines 661–678. In a preferred embodiment, there are eighteen multiplexors 621–638 which interface with input lines 601–618 and output lines 661–678, respectively. With the assistance of mask control 330, in a manner hereinafter explained, each of multiplexors 621–638 selects a single bit from its associated one of input lines 601–618 and transmits only the selected bit on its associated one of output lines 661–678. Optionally, mask control 330, in a manner hereinafter explained, may cause one or more of multiplexors 621–638 to ignore all bits on its associated one of input lines 601–618 and automatically select a value of "zero". The selected bits and zero values on output lines 661–678 together form an 18-bit outbound pointer.

Multiplexor bit selection is directed by mask control 330. Referring to FIG. 7, mask control 330 is shown to include mask registers 710 and associated mask logic 720. Mask registers 710 are memory elements in which different hash masks for different inbound identifier types are stored. In a preferred embodiment, hash masks include a hash mask for use in reducing 32-bit inbound identifiers to outbound pointers and a hash mask for use in reducing 48-bit inbound identifiers to outbound pointers. Hash masks may also include different masks for different types of common bit-length inbound identifiers, such as a 32-bit IP destination address and a 32-bit IP destination network identifier. Mask registers 710 may be advantageously configured as an array of registers, each of which holds all or part of the hash mask for a particular inbound identifier type. The hash masks stored in mask registers 710 may be advantageously programmed and updated by CPU 110 on clock cycles in which CPU 110 would otherwise be idle. Values for hash masks are preferably calculated by a hashing algorithm such that any inbound identifier received by multiplexor array 320 from mode control 310 may be advantageously reduced to an outbound pointer which includes the desired number of bits for a pointer from bit positions that the hashing algorithm has deemed the most effective at distinguishing inbound identifiers from one another. Hash masks may also contain "null select" values causing a value of "zero" to be selected, rather than selecting from certain bit positions within the inbound identifier, when such bit positions are known a priori to be incapable of distinguishing the inbound identifier from other identifiers. More particularly, each of multiplexors 621–638 interfaces with one of mask lines 641–658. Mask control 330 selects a hash mask based on the mask select command received from mode control 310. Upon receipt of a mask select command, mask logic 720 retrieves from mask registers 710 the selected hash mask. Hash mask preferably includes a different multi-bit bit select command for release to each one of multiplexors 621–638 on mask lines 641–658, respectively. Bit select commands are each sufficient to identify the single bit of the inbound identifier, if any, each of multiplexors 621–638 is to select for inclusion in the outbound pointer. In a preferred embodiment, there are eighteen mask lines 641–658 which transmit bit select commands to respective multiplexors 621–638. Thus, when mask select command indicates a hash mask for a 32-bit identifier, mask lines 641–658 each transmit a four-bit bit select command causing its associated one of multiplexors 621–638 to select one of fifteen bits made available on its associated one of input lines 601–618, or to select "zero". When mask select command indicates a hash mask for a 48-bit identifier, mask lines 641–658 each transmit a five-bit bit select command causing its associated one of multiplexors 621–638 to select one of thirty-one bits made available on its associated one of input lines 601–618, or to select "zero". Thus, for example, in the case of a 32-bit identifier, bits 0 through 14 are made available to multiplexor 621 on input lines 601, bits 1 through 15 are made available to multiplexor 622 on input line 602, and so on, such that bits 17 through 31 are made available to multiplexor 638 on input line 618. Bit select command received by multiplexor 621 on line 641 instructs multiplexor 621 to select one of bits 0 through 14, if any, for transmission on output line 661; bit select command received by multiplexor 622 on line 642 instructs multiplexor 622 to select one of bits 1 through 15, if any, for transmission on output line 662; and so on, such that bit select command received by multiplexor 638 on line 658 instructs multiplexor 638 to select one of bits 17 through 31, if any, for transmission on output line 678. Similarly, for a 48-bit identifier, bits 0 through 30 are made available to multiplexor 621 on input lines 601, bits 1 through 31 are made available to multiplexor 622 on input line 602, and so on, such that bits 17 through 47 are made available to multiplexor 638 on input line 618. Bit select command received by multiplexor 621 on line 641 instructs multiplexor 621 to select one of bits 0 through 30, if any, for transmission on output line 661; bit select command received by multiplexor 622 on line 642 instructs multiplexor 622 to select one of bits 1 through 31, if any, for transmission on output line 662; and so on, such that offset select command received by multiplexor 638 on line 658 instructs multiplexor 638 to select one of bits 17 through 47, if any, for transmission on output line 678. It will be appreciated that by assigning bit position subsets to multiplexors 621–638 which are offset in one-bit increments and sufficiently large such that each bit position is assigned to at least one multiplexor, mask control 330 may advantageously instruct multiplexors 621–638 to extract any possible combination of bits from the inbound identifier for inclusion in the outbound pointer. The outbound pointer is transmitted to match control 340.

Figure 9:
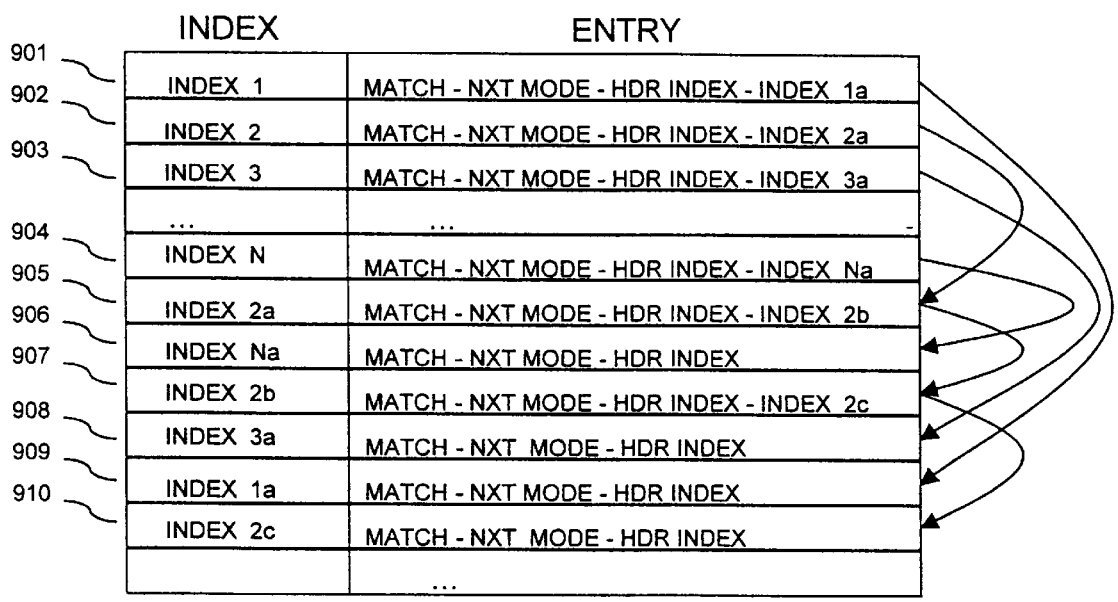
FIG. 9 is a diagram of an entry set of the hash RAM of FIG. 8a or FIG. 8b.

Match control 340 interfaces with hash RAM 120 to perform associative comparisons using each outbound pointer received from multiplexor array 320. More particularly, match control 340 receives an offset command from mode control 310 and the outbound pointer from multiplexor array 320 and concatenates the command and pointer into an initial pointer. Referring to FIG. 8a, in a preferred embodiment, there is a corresponding entry set in hash RAM 120 for different identifier types. Thus, entry sets include IP destination address/IPX destination network identifier entry set 810, IP source address entry set 820, IP source address/source port identifier entry set 830 and IPX node identifier set 840. The outbound pointer is offset by the offset command to the entry set for the identifier type of the inbound identifier and the resulting pointer is used as the initial pointer to hash RAM 120 to retrieve the contents of the entry associated with the index whose value matches the initial pointer. The initial pointer is operative to instigate a walk-through a linked list of entries within the entry set which continues until either a match is found or the end of the linked list is reached. For example, referring to FIG. 9, entry set 900 includes, as related pairs, indices and entry contents. Entry contents include, for each entry, match information, next mode information, a header index and a next pointer, if any. Entry set 900 includes N entry subsets which form N linked lists, or "buckets". The first bucket includes indices 901 and 909. The second bucket includes indices 902, 905, 907 and 910. The third bucket includes indices 903 and 908. The Nth bucket includes indices 904 and 906. As shown in FIG. 9, if the initial pointer points to index 902 and the match information returned does not match the match identifier received on match control 340 from mode control 310 for use as a comparand, the next pointer in the linked list (identifying index 905) is returned from index 902 and used as a pointer to index 905. If match information returned from index 905 does not match the match identifier, the next pointer in the linked list (identifying index 907) is returned from index 905 is used as a pointer to index set 907. Match control 340 continues this walk-through in hash RAM 120 until either a match is found or a next pointer is not valid (i.e., the entry at index 910), which indicates that the last entry in the bucket has been reached. If a match is found, match control 340 checks the next mode information associated with the matching index to determine whether an extended recursive look-up is indicated. If an extended recursive look-up is not indicated, match control 340 transmits the header index associated with the matching entry to header cache 230 for generating an outbound packet header. If an extended recursive look-up is indicated, match control 340 transmits a change mode request to mode control 310 and mode control 310 initiates another and any subsequently indicated associative comparisons on different identifiers from the same identifier set until either a match is found which does not indicate an extended recursive look-up or no match is found.

Performance monitor 350 tracks the performance of match control 340 and instructs CPU 110 to update the hash masks in mask registers 710 whenever performance has sufficiently deteriorated. In a preferred embodiment, performance monitor 350 increments a value within a memory location for each failed attempt to match a returned match identifier with match information. When performance as measured by the number of failed attempts has dropped below a particular minimum performance standard, performance monitor 350 transmits a mask update command to CPU 110 instructing CPU 110 to recalculate the hashing algorithm and update mask registers 710, preferably on CPU clock cycles during which CPU 110 would otherwise be idle. Various minimum performance standards may be implemented based on considerations such as the aggregate number of failed attempts, the highest number of failed attempts for a particular walk-through, the average number of failed attempts per walk-through or the frequency with which a number of failed attempts has been surpassed. The minimum performance standard may be programmable on performance monitor 350. It will be appreciated that whenever hash masks are changed, the entries in hash RAM 120 must be rewritten to new indexed locations in hash RAM. This rewriting operation may also be conducted by CPU 110 on otherwise idle clock cycles.

Figure 10:
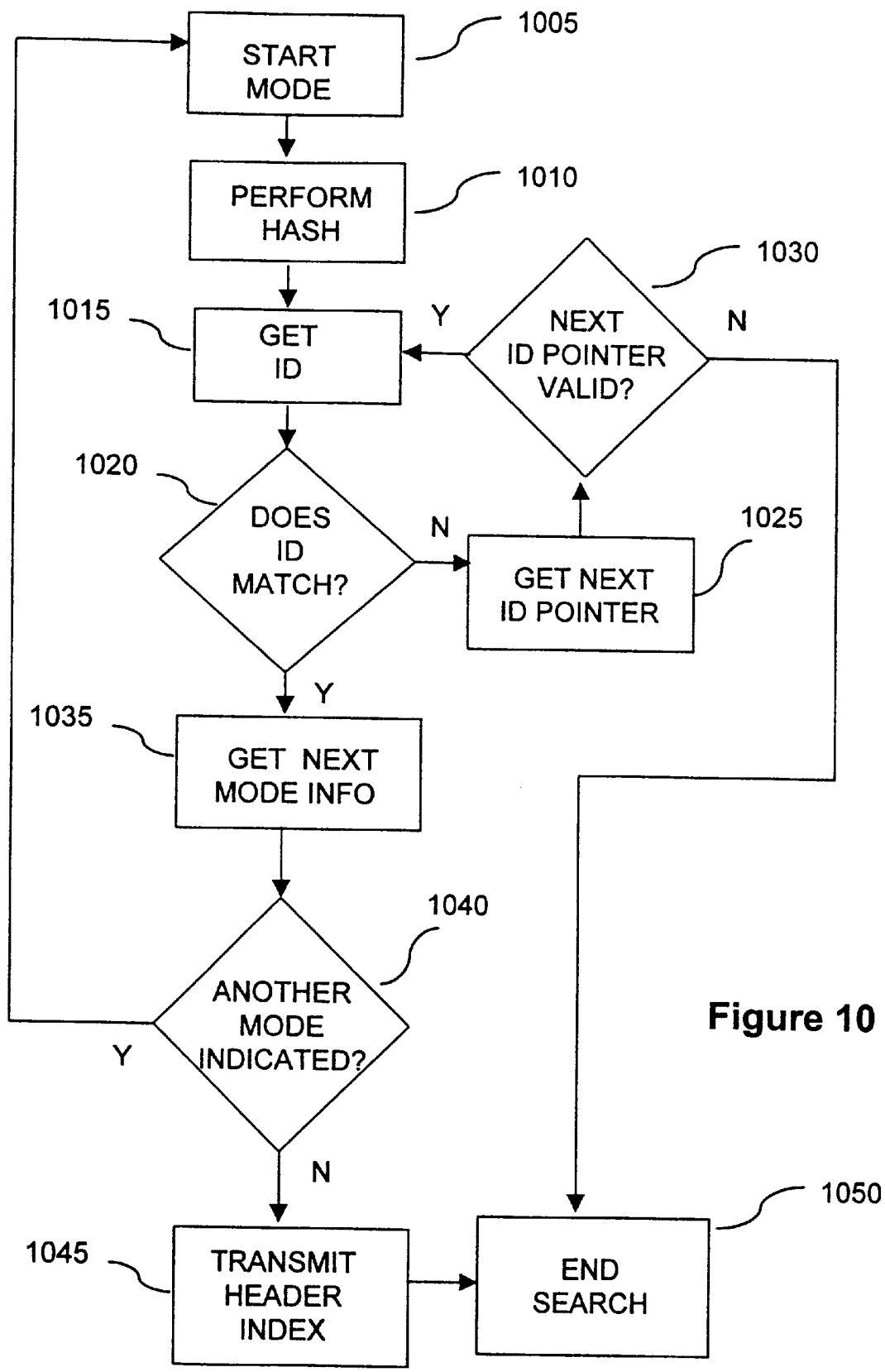
FIG. 10 is a flow diagram illustrating the operation of the pseudo CAM logic of FIG. 2 on an inbound identifier set in accordance with a preferred embodiment of the invention.

Referring to FIG. 10, a flow diagram illustrates the operation of pseudo CAM logic 220 on an inbound identifier set. Identifier set is received by mode control 310. Mode control 310 determines the mode (1005), selects an inbound identifier from the identifier set and transmits the inbound identifier to multiplexor array 320. Mode control 310 also selects a match identifier and transmits the match identifier to match control 340. Mode control 310 transmits to mask control 330 commands sufficient to select a hash mask and transmits to match control 340 a command sufficient to offset the pointer to the appropriate entry set. Multiplexor array 320 performs a hashing operation (1010) which reduces the inbound identifier to an outbound pointer using bit select commands received from mask control 330. Multiplexor array 320 transmits the outbound pointer to match control 340. Match control 340 forms an initial pointer from the received offset command and the pointer and retrieves match information from a corresponding entry in hash RAM (1015). Match control 340 compares, for a match, the match information with the match identifier (1020). If a match is not found, match control 340 checks the next pointer (1025 and 1030). If a next pointer is valid, step 1015 is repeated. If a next pointer is invalid, all entries in the bucket have been checked and the search terminates (1050). If a match is found, match control 340 checks next mode information (1035–1040). If another mode is indicated, step 1005 is repeated. If another mode is not indicated, match control 340 retrieves the header index and transmits the header index to header cache 230.

Referring now to FIG. 8b, in a more preferred embodiment, global entry sets are configured in hash RAM 120 for each IP and IPX identifier set to enable pseudo CAM logic 220 to perform single-mode global associative comparisons. In the more preferred embodiment, entry sets in hash RAM 120 include global IP entry set 850 and global IPX entry set 860. Each entry in global entry sets 850, 860 includes match information for an entire 80-bit identifier set. Operation proceeds generally as in the preferred embodiment except that the match command from mode registers 410 causes identifier set parsing unit 430 to transmit to match control 340 a global match identifier which includes all identifiers within the identifier set to be matched. The match information retrieved from hash RAM 120 is compared with the global match identifier such that further look-up modes are obviated. If a global match is found, match control 340 simply transmits the header index associated with the matching entry to header cache 230 for generating an outbound packet header.

Figure 11:
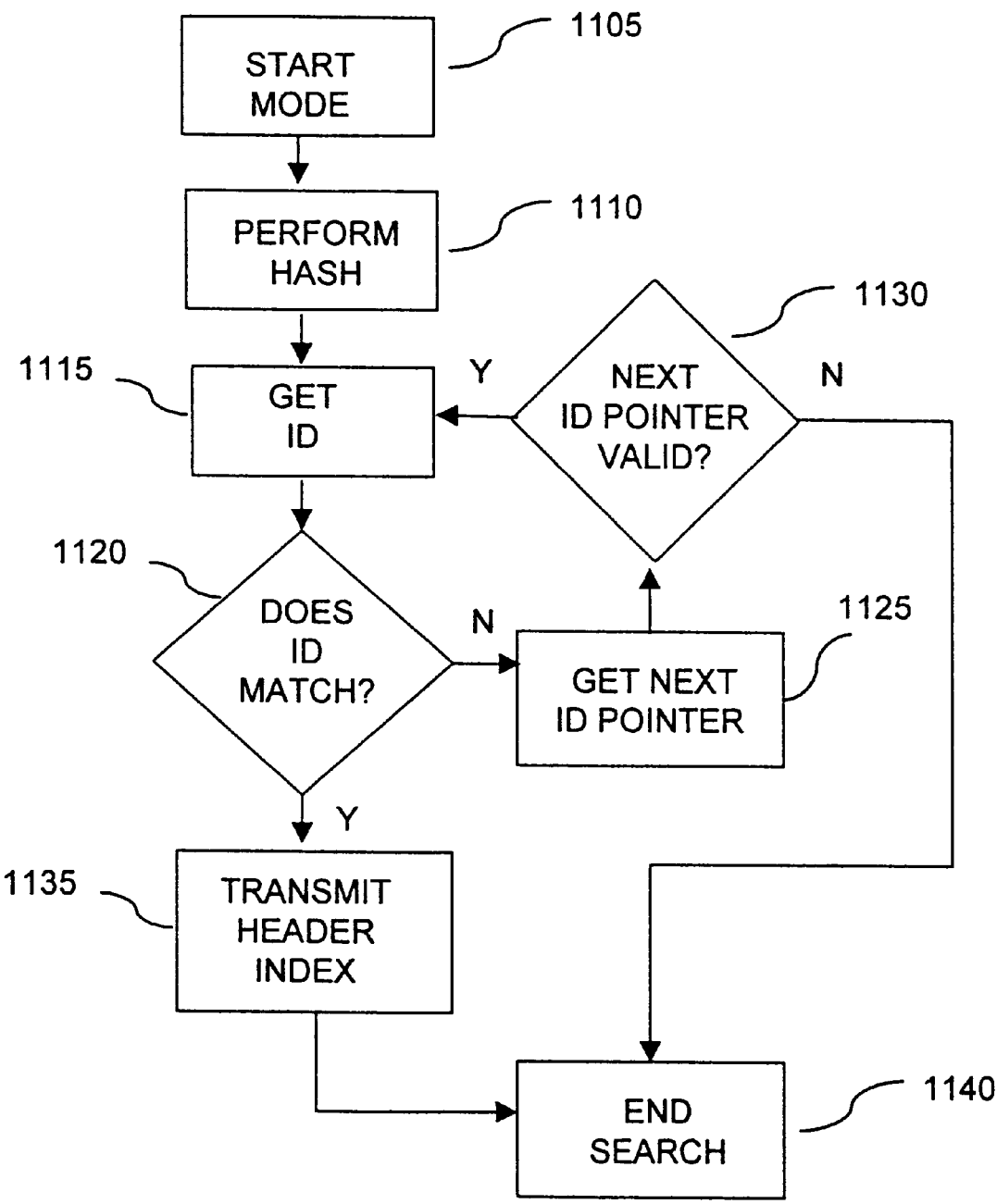
FIG. 11 is a flow diagram illustrating the operation of the pseudo CAM logic of FIG. 2 on an inbound identifier set in accordance with a more preferred embodiment of the invention.

Referring to FIG. 11, a flow diagram illustrates the operation of pseudo CAM logic 220 on an inbound identifier set in the more preferred embodiment of the invention. Identifier set is received by mode control 310 and it is determined that the global mode is indicated (1105). Mode control 310 selects an inbound identifier from the identifier set and transmits the inbound identifier to multiplexor array 320. Mode control 310 also selects a global match identifier and transmits the global match identifier to match control 340. Mode control 310 separately transmits to mask control 330 commands sufficient to select a hash mask and transmits to match control 340 a command sufficient to offset the initial pointer to the appropriate global entry set. Multiplexor array 320 performs a hashing operation (1110) which reduces the inbound identifier to an outbound pointer using a hash mask received from mask control 330. Multiplexor array 320 transmits the outbound pointer to match control 340. Match control 340 forms an initial pointer from the received offset command and outbound pointer and retrieves match information from hash RAM (1115). Match control 340 compares for a match the match information with the global match identifier (1120). If a global match is not found, match control checks the next pointer (1125 and 1130). If a next pointer is valid, step 1115 is repeated. If a next pointer is not valid, all entries in the bucket have already been checked and the search terminates (1140). If a global match is found, match control retrieves the header index and transmits the header index to header cache 230.

It will be appreciated by those of ordinary skill in the art that the invention can be embodied in other specific forms without departing from the spirit or essential character hereof. The present description is therefore considered in all respects illustrative and not restrictive. The scope of the invention is indicated by the appended claims, and all changes that come within the meaning and range of equivalents thereof are intended to be embraced therein.

I claim:

1. Custom circuitry for reducing an L-bit data unit into an N-bit data unit selectable to include any combination of bits from the L-bit data unit, where L is an integer greater than two, N is an integer greater than one and L is greater than N, comprising:

N successive multiplexors, each multiplexor receiving as inputs bits from M bit positions within the L-bit data unit including all but the first bit received as an input by the immediately preceding multiplexor, if any, and all but the last bit received as an input by the immediately succeeding multiplexor, if any, and wherein M is an integer sufficiently great such that each bit within the L-bit data unit is received as an input by at least one of the N successive multiplexors; and means for instructing each multiplexor to select for transmission as an output a single bit, if any, from the bits received as inputs by the multiplexor.

2. The custom circuitry according to claim 1, wherein the instructing means includes means for transmitting to each multiplexor a command identifying a single bit position, if any, from which the multiplexor is to select a bit for transmission as an output.

3. The custom circuitry according to claim 1, wherein the instructing means includes means for transmitting to the N successive multiplexors commands which in the aggregate identify the up to N bit positions within the L-bit data unit, which are the most distinctive according to the most recent calculation made by a hashing algorithm, from which the multiplexors are to select bits for transmission as outputs.

4. The custom circuitry according to claim 2, wherein the command is stored in and retrieved from a memory element.

5. The custom circuitry according to claim 3, wherein the commands are stored in and retrieved from one or more memory elements.

6. In a hardware routing engine, custom circuitry for implementing a dynamic data hashing algorithm, comprising:

means for selecting an identifier from an identifier set;

means for reducing the identifier to a value, the value including bits from the bit positions within the identifier which are the most distinctive according to the most recent calculation made by a hashing algorithm;

means for adding an offset, if required, to the value to create an initial pointer to the first RAM entry in a linked list of one or more RAM entries; and means for using the initial pointer, and any subsequent pointer retrieved from any accessed RAM entry in the linked list, to access the first and any subsequent RAM entry, respectively, and retrieve match information for comparison with a match identifier associated with the identifier set, until either a match is found or all RAM entries in the linked list have been accessed.

7. The custom circuitry according to claim 6, further comprising:

means for tracking the number of comparisons for which a match is not found; and means for instructing the hashing algorithm to recalculate the most distinctive bit positions if the number of comparisons for which a match is not found has exceeded a configurable number.

8. The custom circuitry according to claim 6, further comprising:

means for tracking the number of comparisons for which a match is not found;

means for tracking the number of linked lists for which a configurable number of comparisons for which a match is not found has exceeded a configurable number; and means for instructing the hashing algorithm to recalculate the most distinctive bit positions if the number of linked lists has exceeded a configurable number.

9. In a hardware routing engine, custom circuitry for implementing a dynamic data hashing algorithm, comprising:

means for selecting a look-up mode based on the most recent look-up mode information;

means for selecting an identifier from an identifier set based on the selected look-up mode;

means for reducing the identifier to value, the value including bits from the bit positions within the identifier which are the most distinctive according to the most recent calculation made by a hashing algorithm;

means for adding an offset, if any, to the value to generate an initial pointer to the first RAM entry in a linked list of one or more RAM entries;

means for using the initial pointer, and any subsequent pointer retrieved from any accessed RAM entry in the linked list, to access the first and any subsequent RAM entry, respectively, and retrieve match information for comparison with a match identifier associated with the identifier set, until either a match is found or all RAM entries in the linked list have been accessed;

means for retrieving any subsequent look-up mode information from the RAM entry for which a match is found; and means for transmitting any subsequent look-up mode information to the look-up mode selecting means.

10. The custom circuitry according to claim 9, further comprising:

means for determining the number of RAM entries accessed in the linked list; and means for instructing the hashing algorithm to recalculate the most distinctive bit positions if the accessed number of RAM entries has exceeded a configurable number.

11. A method for reducing a first data unit into a second data unit selectable to include any combination of bits from the first data unit, comprising:

inputting to each multiplexor within an array of multiplexors a plurality of bits from the first data unit including all but the first bit received as an input by an immediately preceding multiplexor in the array, if any, and all but the last bit received as an input by an immediately succeeding multiplexor in the array, if any, and wherein the number of bits is sufficiently great such that each bit within the first data unit is received as an input by at least one of the multiplexors within the array; and outputting from each multiplexor a single bit, if any, from the plurality of bits received as inputs.

12. A method for implementing a dynamic data hashing algorithm, comprising:

selecting an identifier from an identifier set;

reducing the identifier to a value, the value including bits from the bit positions within the identifier which are the most distinctive according to the most recent calculation made by a hashing algorithm;

adding an offset, if required, to the value to create a pointer to the first RAM entry in a linked list of one or more RAM entries; and using the pointer, and any subsequent pointer retrieved from any accessed RAM entry in the linked list, to access the first and any subsequent RAM entry, respectively, and retrieve match information for comparison with a match identifier associated with the identifier set, until either a match is found or all RAM entries in the linked list have been accessed.

13. A method for implementing a dynamic data hashing algorithm, comprising:

selecting a look-up mode based on the most recent look-up mode information;

selecting an identifier from an identifier set based on the selected look-up mode;

reducing the identifier to a value, the value including bits from the bit positions within the identifier which are the most distinctive according to the most recent calculation made by a hashing algorithm;

adding an offset, if any, to the value to generate a pointer to the first RAM entry in a linked list of one or more RAM entries;

using the pointer, and any subsequent pointer retrieved from any accessed RAM entry in the linked list, to access the first and any subsequent RAM entry, respectively, and retrieve match information for comparison with a match identifier associated with the identifier set, until either a match is found or all RAM entries in the linked list have been accessed;

retrieving any subsequent look-up mode information from the RAM entry for which a match is found; and applying any subsequent look-up mode information in a subsequent look-up mode selection.

* * * * *